United States Patent
Malik

(10) Patent No.: US 7,464,139 B2
(45) Date of Patent: *Dec. 9, 2008

(54) METHODS FOR ESTABLISHING AN INSTANT MESSAGE CONFERENCE

(75) Inventor: Dale W. Malik, Atlanta, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 1159 days.

This patent is subject to a terminal disclaimer.

(21) Appl. No.: 10/165,814

(22) Filed: Jun. 7, 2002

(65) Prior Publication Data

US 2003/0229673 A1 Dec. 11, 2003

(51) Int. Cl.
*G06F 15/16* (2006.01)
(52) U.S. Cl. .................................. 709/206
(58) Field of Classification Search ............. 709/203, 709/204, 206, 207; 705/598
See application file for complete search history.

(56) References Cited

U.S. PATENT DOCUMENTS

| | | | | |
|---|---|---|---|---|
| 5,303,145 A | * | 4/1994 | Griffin et al. | 705/9 |
| 5,862,325 A | * | 1/1999 | Reed et al. | 709/201 |
| 5,897,616 A | * | 4/1999 | Kanevsky et al. | 379/88.02 |
| 6,065,044 A | * | 5/2000 | Ogasawara | 709/207 |
| 6,108,688 A | * | 8/2000 | Nielsen | 709/206 |
| 6,175,859 B1 | * | 1/2001 | Mohler | 709/206 |
| 6,195,117 B1 | * | 2/2001 | Miyazaki | 348/14.09 |
| 6,256,663 B1 | * | 7/2001 | Davis | 709/204 |
| 6,301,609 B1 | * | 10/2001 | Aravamudan et al. | 709/207 |
| 6,363,352 B1 | * | 3/2002 | Dailey et al. | 705/9 |
| 6,490,574 B1 | * | 12/2002 | Bennett et al. | 706/47 |
| 6,496,852 B1 | * | 12/2002 | Yamaguchi | 709/206 |
| 6,505,233 B1 | * | 1/2003 | Hanson et al. | 709/204 |
| 6,636,888 B1 | * | 10/2003 | Bookspan et al. | 709/203 |
| 6,691,162 B1 | * | 2/2004 | Wick | 709/206 |
| 6,721,784 B1 | * | 4/2004 | Leonard et al. | 709/206 |
| 6,732,103 B1 | * | 5/2004 | Strick et al. | 705/9 |
| 6,775,690 B1 | * | 8/2004 | Creswell et al. | 709/206 |
| 6,871,216 B2 | * | 3/2005 | Miller et al. | 709/206 |
| 2002/0006803 A1 | * | 1/2002 | Mendiola et al. | 455/466 |
| 2002/0059379 A1 | * | 5/2002 | Harvey et al. | 709/205 |
| 2002/0120697 A1 | * | 8/2002 | Generous et al. | 709/204 |
| 2002/0133552 A1 | * | 9/2002 | Ooi et al. | 709/205 |
| 2002/0136390 A1 | * | 9/2002 | Lang et al. | 379/222 |
| 2002/0156848 A1 | * | 10/2002 | Grouse | 709/204 |
| 2002/0172340 A1 | * | 11/2002 | Kato | 379/201.01 |
| 2003/0018724 A1 | * | 1/2003 | Mathewson et al. | 709/206 |
| 2003/0055908 A1 | | 3/2003 | Brown et al. | |

(Continued)

*Primary Examiner*—Jason D Cardone
*Assistant Examiner*—Ajay Bhatia
(74) *Attorney, Agent, or Firm*—Cantor Colburn LLP

(57) ABSTRACT

A method for displaying content of a time-sensitive e-mail message to a recipient, wherein the content displayed is based on when the recipient opens the time-sensitive e-mail message. A sender of the time-sensitive e-mail message establishes content and a rule set for delivering the e-mail message. The rule set contains a predefined time limit for allowing the recipient of the time-sensitive e-mail message to open it. If the recipient opens the time-sensitive e-mail message within the predefined time limit, the content within the e-mail is delivered to the recipient. If, however, the recipient fails to open the time-sensitive e-mail message within the predefined time limit, then the time-sensitive e-mail message is either deleted from the recipient's mailbox or an alternative message is displayed.

7 Claims, 5 Drawing Sheets

U.S. PATENT DOCUMENTS

| | | |
|---|---|---|
| 2003/0112948 A1 | 6/2003 | Brown et al. |
| 2003/0131060 A1 | 7/2003 | Hartselle et al. |
| 2003/0154254 A1* | 8/2003 | Awasthi ...................... 709/206 |
| 2003/0204474 A1* | 10/2003 | Capek et al. .................. 705/64 |
| 2003/0229673 A1* | 12/2003 | Malik ......................... 709/207 |
| 2005/0021664 A1* | 1/2005 | Bennett et al. .............. 709/217 |
| 2005/0071428 A1* | 3/2005 | Khakoo et al. .............. 709/204 |
| 2005/0080852 A1* | 4/2005 | Kelley et al. ................ 709/206 |

* cited by examiner

METHODS FOR ESTABLISHING AN INSTANT MESSAGE CONFERENCE

RELATED APPLICATIONS

Reference is made to co-pending patent application Ser. No. 10/165,831, filed on even-date herewith, with inventor Dale W. Malik, entitled "Systems and Methods for Delivering Time-Sensitive Messages Over a Distributed Network."

FIELD OF THE INVENTION

The present invention relates generally to transmitting e-mail messages over a distributed network, and more particularly to electronic conferencing over a distributed network.

BACKGROUND

The Internet is a worldwide network of distributed computers that have the ability to communicate with each other. Because of the ease to communicate with another person halfway around the world, the Internet has gained widespread recognition as a viable communications network, especially for businesses. The easiest and most popular method of communicating with another individual over the Internet is through the use of electronic mail, or "e-mail." To generate an e-mail message, the sender typically selects the recipient's e-mail address from a drop down list of available users. The sender then inputs a message he/she wishes to send to the recipient and forwards it onto an electronic message server at the sender's Internet Service Provider ("ISP"). The ISP then extracts the recipient's address from the e-mail message and forwards it onto the message server of the recipient's ISP, where it is stored until the recipient logs onto his or her Internet appliance and retrieves the e-mail message.

However, as unread e-mail messages sit on the recipient's message server, the e-mail messages age and their content may become outdated or obsolete by the time the recipient opens his or her e-mail messages. For example, an e-mail message inviting a person to a conference at 11:00 a.m. becomes obsolete if the recipient fails to read the e-mail message by 11:01 a.m. In this circumstance, it would be helpful to alter the content of the original message if the recipient does not open the e-mail message by a specified date and time. Allowing the dated material to remain unopened in the recipient's e-mail system not only wastes valuable resources, but also decreases the productivity of the recipient by cluttering his or her e-mail box with useless and obsolete messages. The recipient has no way of knowing which messages are obsolete and which message are relevant until they open each message.

In other instances, electronic coupons have become a popular method for retailers to advertise their products and increase sales. Typically, retailers send electronic coupons that have a sliding discount rate or become useless past the date of promotion. That is, the longer the recipient waits to open and to use the electronic coupon, the less the discount rate or potential for usage. For example, as an incentive to generate business, a retailer may send out an electronic coupon, which offers a discount rate 50% off the retail price of an item if the coupon is opened and used within one week of when it was sent. Once the week has passed, the discount rate may drop to 10%. Normally, the retailer would have to send out a second electronic coupon to those patrons that did not redeem the first electronic coupon within the first week. Unfortunately, sending multiple electronic coupons with varying discount rates is both costly and time consuming for the retailer and also consumes valuable computing resources. Additionally, sending multiple electronic coupons can irritate the customer. It would therefore, be more effective and less obtrusive to send out a single electronic message that contains both levels of the promotion and delivers only the promotion that is relevant at the time the message is read.

Typical methods of regulating e-mail messages are based on filtering e-mail messages received at the recipient's Internet appliance or message server. In these methods, the recipient establishes a rule set, which is stored on his or her message server or e-mail application. For instance, the recipient may establish rules to exclude all e-mail messages from a particular Internet address or all e-mail messages having a specific content. As an example, a filter may be set up on the message server to block all unsolicited messages, or "Spam," that come from a known IP address. Although these methods regulate which e-mail messages are delivered to a particular user, these filter or blocking methods are set up by the recipient. These methods do not allow the sender to establish a rule set for determining how a recipient views the content based on when the recipient opens his or her e-mail message.

Thus, there is a need in the art for a method to deliver an e-mail message to a recipient over a distributed network, wherein the content of the message is based on how long the message remains unread after it is sent to the recipient's Internet appliance.

SUMMARY OF THE INVENTION

The present invention is directed toward systems and methods for altering the content of an e-mail message based on the time the e-mail message has been sitting without being read in the recipient's mail system. Generally described, a method according to an embodiment of the invention is for transmitting an e-mail message to a recipient containing time-sensitive content, based on when the recipient opens the e-mail message. More particularly described, a method is for delivering time-sensitive e-mail messages to a recipient. First, the sender of an e-mail message establishes a rule set for delivering the time-sensitive e-mail message. Next, the sender creates at least one message, or content for the e-mail message. The sender then transmits the e-mail message to a message server. Once the message server receives the e-mail message, the rule set is typically extracted from the header of the e-mail message. The content of the e-mail message is then placed in a mailbox associated with the recipient. The rule set contains a predefined time limit for allowing the recipient of the e-mail message to retrieve or open the message and any associated linkages contained in the message. If the recipient opens the e-mail message within the predefined time limit, the content of the e-mail message is displayed. If, however, the recipient fails to open or retrieve the e-mail message from his or her mailbox, then the e-mail message is either deleted from the recipient's mailbox or an alternative message is displayed based on the rule set supplied by the sender.

A system according to an embodiment of the invention is for facilitating the delivery of a time-sensitive e-mail message between a sender and a recipient. The system contains a message server that is capable of receiving the time-sensitive e-mail message from the sender, which contains at least one message, or content, and a rule set that governs the delivery of the content to the recipient. The message server also contains an e-mail message application program, which extracts the rule set from the time-sensitive e-mail message. The e-mail message application program retrieves a predefined time limit for allowing the recipient to open the e-mail message and sets a timer to the predetermined time limit. The message server then stores the time-sensitive e-mail message in a mailbox associated with the recipient. The e-mail message application program then determines whether the recipient opened or received the e-mail message within the predefined time limit. If the recipient opened the e-mail message within the predefined time limit the e-mail message application program displays the content of the e-mail message in accordance with the rule set to the recipient.

That the invention improves over the drawbacks of electronic mail systems and methods and addresses the advantages described above will become apparent from the following detailed description of the exemplary embodiments and the appended drawings and claims.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings.

DETAILED DESCRIPTION

Figure 1:
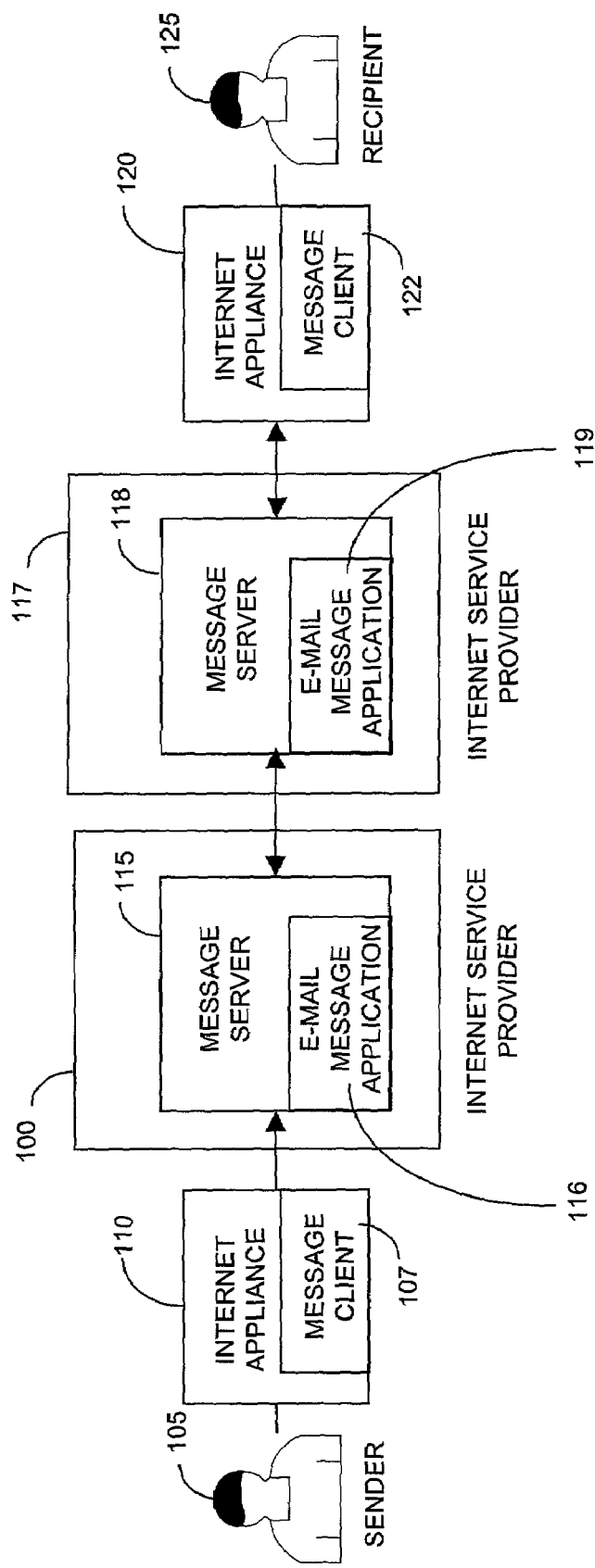
FIG. 1 is an illustration of a system according to an embodiment of the present invention for sending time-sensitive e-mail messages between a sender and a recipient.

FIG. 1 is an illustration of a typical Internet Service Provider (ISP) network according to an embodiment of the present invention for sending time-sensitive e-mail messages between a sender 105 registered with a first Internet Service Provider 100 and a recipient 125 registered with a second Internet Service Provider 117. While the invention will be described with reference to two ISPs 100 and 117, it should be understood that the systems and methods according to the invention may be used with just one ISP or with more than two ISPs.

The sender 105 creates a time-sensitive e-mail message using a message client 107 on his or her Internet appliance 110 to send to the recipient 125. Normally, the Internet appliance 110 will be a personal computer. However, those skilled in the art will appreciate that the Internet appliance 110 may be any device that is capable of sending and receiving e-mail messages, such as a Web-enabled cellular telephone, a Blackberry®, a pager, a personal digital assistant (PDA), a pager, or the like. Furthermore, for purposes of this application, a time-sensitive e-mail message is defined as any e-mail message that contains content that becomes obsolete or which the sender 105 wishes to alter after a predefined amount of time has elapsed.

The sender 105 also establishes a rule set using the message client 107 at the time he or she creates the e-mail message. The rule set is used to determine whether and how the content of time-sensitive e-mail message is presented to the recipient 125. As a result, the rule set may contain instructions to delete the time-sensitive e-mail message if the time-sensitive e-mail message remains unread after a certain period of time or to display an alternate e-mail message with alternative content if the recipient 125 has not opened the first time-sensitive e-mail message within a predefined time limit. For example, the sender 105 may wish to know the answer to a particular question to present to a client at a meeting within an hour. The sender 105 may send an e-mail message to a colleague back at the office asking for the answer to the question. However, if the sender's colleague does not answer the e-mail message, for whatever reason, before the client meeting, then there is no reason to keep the e-mail message sent to the colleague. Therefore, the sender 105 may embed a rule within the e-mail message to delete the e-mail message from the message server if the colleague does not open it within one hour.

Once the sender 105 has composed the time-sensitive e-mail message and included the rule set for delivering the message, the time-sensitive e-mail message is forwarded to a message server 115 with ISP 100. The message server 115 then performs the appropriate routing instructions to reach the intended recipient's message server 118. When the time-sensitive e-mail message is forwarded to the message server 115, the message server 115 determines if the time-sensitive e-mail message needs to be forwarded to another message server and, if so, transfers the time-sensitive message to the message server, such as to message server 118.

When the message server 118 receives the e-mail message, it launches an e-mail message application 119 to determine whether the time-sensitive e-mail message contains a time-based header embedded in the subject field of the message. Although the time-based header is described as being embedded in the subject field of the message, those skilled in the art will appreciate that the time-based header may be embedded in other portions of the time-sensitive e-mail message as appropriately configured between the message client 107 that creates it and the e-mail message application 119 that interprets it.

The e-mail message application 119 examines the header of the time-sensitive e-mail message to determine how the message should be marked for storage and eventual retrieval and deletion. Each time-sensitive e-mail message is placed in a folder within the recipient's mailbox and is marked with a date and time stamp. The time-sensitive e-mail message remains on the message server 118 until the recipient downloads it, or the e-mail message application 119 deletes it once the time for the recipient to retrieve the time-sensitive e-mail messages has expired. The e-mail message application 119 typically examines the time-sensitive e-mail messages on a periodic basis to determine whether any of the time-sensitive e-mail messages that contain time-sensitive content have been marked for time expiration. For example, the e-mail message application 119 may run on an hourly basis seeking to review the folders that have been marked for time expiration at that moment. The e-mail message application 119 may operate more frequently, such as every minute or at other intervals of time. Any time-sensitive e-mail messages that are marked for deletion are removed at that time. In addition, some of the time-sensitive messages may be chained to other messages that will succeed them. Information about chained messages is included in the embedded header. An example of the embedded header is shown below.

Subject:\message ID∧Start Date/Time∧Stop Date/Time∧# of correlated messages∧sequence of this message∧Subject to be displayed/

The message ID field is used to identify the message and correlate additional messages. The "Start Date/Time" field contains the date stamp and time stamp of when the message server 118 received the time-sensitive e-mail message. The "Stop Date/Time" field contains a date stamp and time stamp that corresponds to the date and time to when the time-sensitive e-mail message should be removed from the message server 118. The "# of correlated messages" field contains a value equal to the number of e-mail messages that are related to the same subject. For instance, if the sender 105 only composed one e-mail message, this field would contain the value "1." However, if two messages were being sent, the embedded header would include a designation of "2" in the "# of correlated messages" field to indicate that there are 2 related messages. Next, the "sequence of this message" field contains a value that corresponds to the order in which the e-mail message should be presented to the recipient, if more than one correlated message is sent. Finally, the "Subject to be displayed" field contains a text message that is presented to the recipient.

As an example, a time-sensitive e-mail may contain an advertisement for a one day sale by retailer. The corresponding embedded header for the advertisement may look like:

Subject:\5789Λ5-29-02, 11:00 amΛ5-30-02, 11:00 amΛ1Λ1ΛOne Day Sale at Macy's, May 30, 2002/

In the above example, the one-day sale promotion will be delivered no earlier than May 29, 2002 at 11:00 a.m. and no later than May 30, 2002 at 11:00 a.m. If the e-mail message is sent prior to May 29, 2002, the e-mail message application 119 stores the pending e-mail message in a date and time stamp folder on the message server 118, which corresponds to the Start Date/Time field in the embedded header. Then at 11:00 a.m. on May 29, 2002, the e-mail message application 119 would move the e-mail message to a date and time stamped folder in the recipient's mailbox. Once the recipient 125 logs onto the message server 118, the message client 122 will download the appropriate e-mail message from the recipient's mailbox, if one still exists.

Normally, most time-sensitive e-mail messages will contain a single predefined time limit. However, there is no limit to the number of predefined time limits that the sender 105 may include in the rule set.

As mentioned above, in addition to deleting a time-sensitive e-mail message, the sender 105 may prefer that an alternative message be displayed to the recipient 125 after the expiry of the time period. In the example provided above, the sender 105 sent an e-mail advertising a One Day Sale at Macy's. The sender 105 may alternatively have sent two e-mails with the following headers:

Subject:\5789Λ5-29-02, 11:00 amΛ5-30-02, 11:00 amΛ2Λ1ΛOne Day Sale at Macy's, May 30, 2002/

Subject:\5789Λ5-30-02, 11:00 amΛ5-31-02, 11:00 amΛ1Λ2ΛAfter Sale Clearance at Macy's, May 31, 2002/

As shown in these two exemplary headers, the first e-mail notifies the recipient 125 of a One Day Sale at Macy's on May 30, 2002. If the recipient 125 does not retrieve or open the e-mail by May 30, 2002, at 11:00 a.m., then the message server 118 will make the second e-mail available to the recipient 125. The message server 118 automatically deletes the second e-mail if the recipient 125 does not retrieve or open the e-mail between 11 a.m. on May 30, 2002, and 11:00 a.m. on May 31, 2002. With this example, if the recipient 125 does open or retrieve the first e-mail, then the message server 118 will delete the second e-mail. The message server 119 can easily determine that a second e-mail exists because the header has "2" in the field for the number of correlated messages. To locate the second e-mail, the message server 119 looks for another e-mail having the same message ID of "5789" and which has "2" in the "sequence of message" field. As should be apparent, the message server 119 would seek a third e-mail having the same message ID of "5789" and which has "3" in the "sequence of message" field if the headers of the e-mails had "3" in the field for the number of correlated messages.

In addition to either deleting the time-sensitive e-mail message or displaying an alternative content, the sender 105 may establish a rule set that instructs the message server 115 to direct the time-sensitive e-mail message to a particular Internet appliance 120 at a particular time during the day. For example, if the recipient 125 has multiple Internet appliances, such as a PC, a PDA, and a cellular telephone registered with the ISP, the sender 105 may establish a rule set that instructs the message server 118 to deliver the time-sensitive e-mail message to a particular Internet appliance 120 at a particular time. For instance, the sender 105 may establish a rule set to first attempt to deliver the time-sensitive e-mail message to the recipient's PC between 10:00 a.m. and 12:00 p.m. If the time-sensitive e-mail message is not opened during that time the rules may instruct the message server 115 to attempt to deliver the time-sensitive e-mail message to the recipient's PDA between 12:00 p.m. and 6:00 p.m., and if the time-sensitive e-mail message is still unopened, then to the recipient's cellular telephone between 6:00 p.m. and 10:00 p.m. Establishing a set of logic rules for the delivery of time-sensitive e-mail messages allows the sender 105 greater flexibility in directing the delivery of time-sensitive e-mail messages in a manner that increases productivity while reducing the consumption of computer resources.

The embedded header may be modified to include the IP address of the appropriate Internet appliances along with the date and time in which the time-sensitive e-mail message will be available to the particular Internet appliances. An example of such a header is as follows:

Subject:\message IDΛStart Date/TimeΛStop Date/ TimeΛ# of correlated messagesΛsequence of this messageΛSubject to be displayedΛNo. of Internet AppliancesΛSequence of Internet AppliancesΛStart Date/Time for First Internet ApplianceΛStop Date/Time for First Internet ApplianceΛStart Date/Time for Second Internet ApplianceΛStop Date/Time for Second Internet Appliance/ . . .

where the "No. of Internet Appliances" field contains a value equal to the number of Internet appliances that the sender wishes to send the time-sensitive e-mail message, the "Sequence of Internet Appliances" field contains the IP addresses of the each Internet appliance in the order in which the time-sensitive e-mail message should be sent, the "Start Date/Time for first Internet Appliance" and "Stop Date/Time for first Internet Appliance" fields specify the period of time that the time-sensitive e-mail message should sent to the first Internet device, and the "Start Date/Time for Second Internet Appliance" and the "Stop Date/Time for the Second Internet Appliance" field specify the period of time that the time-sensitive e-mail message should sent to the second Internet device. The "message ID," "Start Date/Time," "Stop Date/ Time," "# of correlated messages," "sequence of this message," and "Subject to be displayed" fields are described above. While this exemplary header only lists two Internet devices, the headers may include additional number of Internet devices.

Although the method according to the present invention is described as being used within an e-mail message system, the method of the present invention may be used in conjunction with any electronic messaging systems, such as an IM system. The systems may also be used with the Universal Instant Messaging system fully described in U.S. patent application Ser. No.10/135,929, entitled "Instant Messaging Architecture and System for Interoperability and Presence Management," filed Apr. 29, 2002, and hereby incorporated by reference.

Figure 2A:
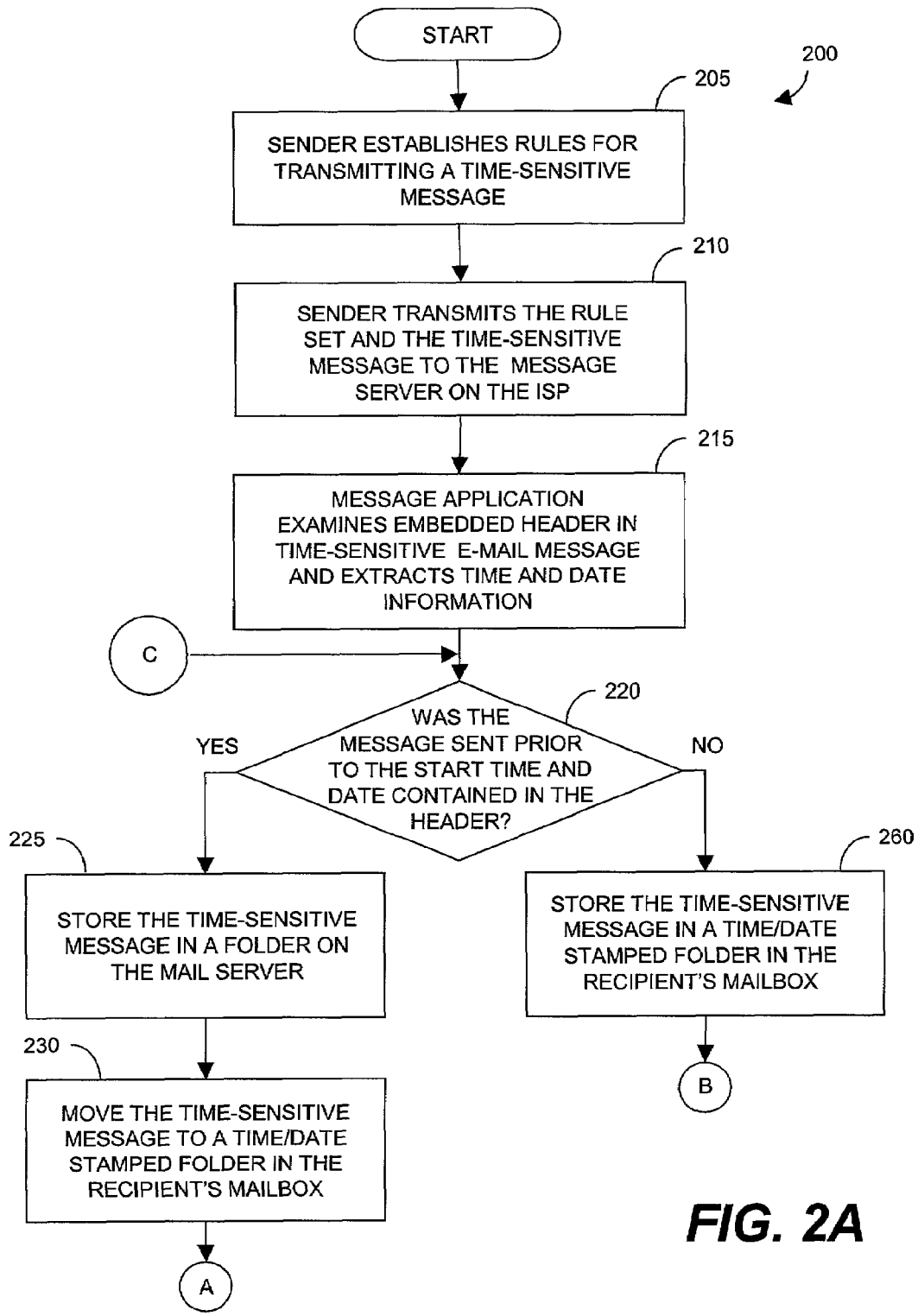
FIGS. 2A and 2B, collectively known as FIG. 2, are logic flow diagrams illustrating a method of transmitting one of several e-mail messages based on the time sensitivity of delivering the e-mail message.
Figure 2B:
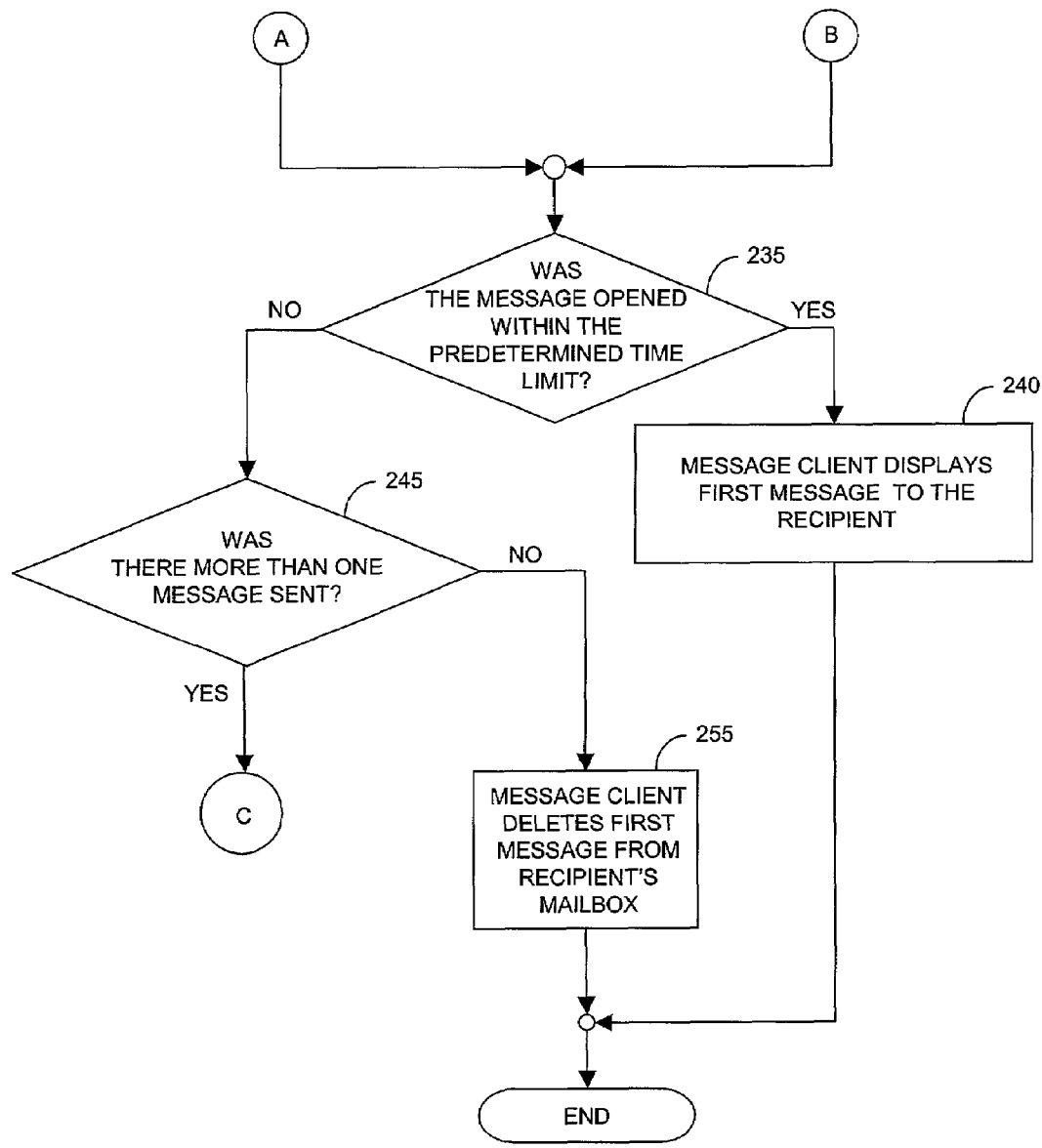

FIGS. 2A and 2B collectively known as FIG. 2, show a logic flow diagram illustrating a routine 200 for establishing a rule set in a time-sensitive e-mail message. Routine 200 begins at 205 in which the sender 105 establishes a rule set for the delivery of the time-sensitive e-mail message to a recipient 125. The rule set is established at the time the e-mail message is created. Typically, the rule set is embedded into the header of the e-mail message. However, the rule set may be embedded anywhere within the e-mail message, such as at the beginning of the actual text message or at the end of the text message. To facilitate the creation of the rules, the message client 107 may display the available rules in a drop-down menu that the sender 105 may graphically select using the standard point-and-click method. Although a drop-down menu allows the sender 105 to easily establish the rule set for the delivery of the e-mail message, other methods, such as a pop-up box of a command line, may be used to create the applicable rule set in the time-sensitive e-mail message. The rule set may include a predefined time limit to allow the recipient 125 to open the time-sensitive e-mail message, instructions to delete the time-sensitive e-mail message, instructions to display an alternative content, list of Internet appliances, sequencing of messages, and the like.

Once the sender 105 has established a rule set for delivering the time-sensitive e-mail message to the recipient 125, the sender 105 then creates the content for the time-sensitive e-mail message. Although, the exemplary embodiment has described the alternative content being presented if a single predefined time limit has passed, those skilled in the art will appreciate that any number of alternative messages may be placed within the time-sensitive e-mail message.

At 210, the time-sensitive e-mail message, along with the embedded rules are transmitted to the message server 115 at the sender's ISP 100. If the recipient 125 is registered with the ISP 100, then the message server 115 maintains the e-mail message. On the other hand, if the recipient 125 has another ISP, such as ISP 117, then the message server 115 forwards the time-sensitive e-mail message to the message server 116 of the ISP 117.

At 215, the e-mail message application 119 at the ISP 117 examines the embedded header and extracts the start time and date information, as well as other relevant information in the header. At 220, the e-mail message application 119 determines whether the e-mail message was sent prior to the date and time contained in the embedded header. The e-mail message application 119 compares the value stored in the Start Date/Time field in the embedded header with the value returned by an internal calendar/clock associated with the message server 118. If the value stored in the Start Date/Time field is greater than the value returned by the internal calendar/clock, then the "YES" branch is followed to 225.

At 225, the time-sensitive e-mail message is temporarily stored in a date/time stamped folder on the message server 118. The time-sensitive e-mail message remains in the date/time stamped folder until the internal calendar/clock matches the date/time stamp of the folder. Once the date/time of the internal calendar/clock matches the date/time stamp of the folder holding the time-sensitive e-mail message, the e-mail message application 119 moves the time-sensitive e-mail message to another date/time stamped folder in the recipient's mailbox at 230. The e-mail message application 119 continually monitors the date/time stamp folders on the message server 118 for messages that need to be moved to the recipient's mailbox. The time-sensitive-e-mail message remains in the date/time stamped folder until the recipient 125 downloads it from the mailbox to the message client 122.

At 235, the determination is made whether the recipient downloaded the time-sensitive e-mail message before value of the time/date stamp of the folder expired. If the recipient downloaded the message within the appropriate time limits, the "YES" branch is followed to 240, in which the first message of the time-sensitive e-mail message is displayed to the recipient.

However, if the time-sensitive e-mail message was not downloaded by the date specified by the date/time stamp of the folder in the recipient's mailbox, the "NO" branch is followed to 245, in which a determination is made whether there is more than one message associated with the time-sensitive e-mail message. The e-mail message application 119 checks the "#of correlated messages" field in the header of the e-mail to determine if the value is greater than 1. If the determination is made by the e-mail message application 119 at 245 that there was only one message sent in the time-sensitive e-mail message, then the "NO" branch is followed to 255 where e-mail message application 119 deletes the message from the recipient's mailbox. If the value in the "#of correlated messages" field is greater than 1, then there is at least one alternative message and the "YES" branch is followed back to 220. At 220, the e-mail message application 119 determines whether this next e-mail message was sent prior to the date and time contained in the embedded header.

Returning to step 235, if the determination is made by the e-mail message application 119 that the time-sensitive e-mail message was opened before the time specified in the "Stop Date/Time" field in the header, then the "YES" branch is followed to 240, in which the e-mail message application 119 provides the first e-mail message to the recipient 125 and discards any additional messages that may have been sent with the time-sensitive e-mail message.

Electronic Conferencing

Figure 3:
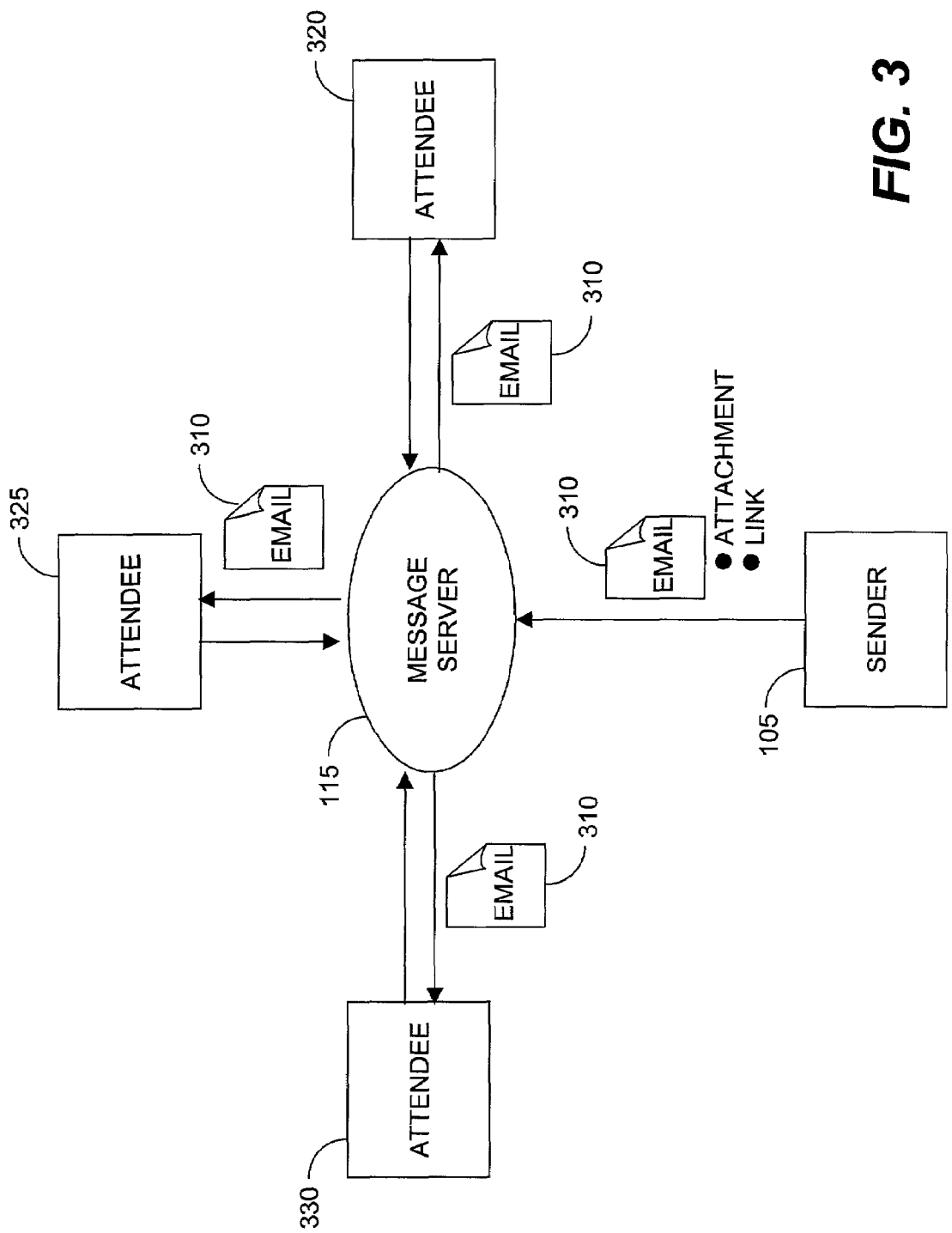
FIG. 3 is an illustration of an example of an instant messaging conferencing network architecture using the present invention.

An application of time-sensitive messaging is establishing an electronic conference in conjunction with instant messaging (IM). FIG. 3 is an illustration of a block diagram illustrating how an electronic conference call may be established using a system according to an embodiment of the present invention. The sender 105 initiates an electronic conference call by generating a conference request, which is preferably an IM conference request embedded in an e-mail message 310. The e-mail message 310 includes an attachment that contains the IM conference information, such as the date and time of the conference, and the e-mail addresses of each person the user wishes to attend the IM conference call. An example of a typical IM conference request may look similar to:

<"text string">/client1@ISP1.com; client2@ISP2.com; client3@ISP3.com where text string is the conference information, such as "Conference call on Monday, July 9, 2001 at 9:00 am" and "client1@ISP1.com," "clien2@ISP2.com," and "client3@ISP3.com" are the e-mail addresses of each of the conference attendees.

The IM conference request is then sent in the e-mail message 310 to the message server 115. The message server 115 then distributes the e-mail message 310 with the IM conference request to each attendee 320, 325, and 330. Although only three attendees are shown in the illustration, those skilled in the art will appreciate that there is no limit to the number of possible attendees that may join in the IM conference call.

When each conference attendee 320, 325, and 330 opens the e-mail message 310, a link is displayed in the message client 122, that enables each attendee to send back a positive reply signal indicating that particular attendee will attend the IM conference call or a negative reply signal indicating that they will not be able to attend the IM conference call. If an attendee generated a positive reply signal, a timer may be set within that attendee's message client 122 to alert the attendee at the appropriate time to join the IM conference call. Additionally, the timer may be set to automatically launch the IM applet within the message client 122 at the appropriate time so that the attendees 320, 325, and 330 can join the IM conference. Once the attendees 320, 325, and 330 have sent their reply message back to the message server 115, the message server 115 reserves the connections between the sender 105 and each attendee who has sent back a positive reply signal.

The e-mail message 310 also contains a rule set in the event that any one of the attendees does not respond to the IM conference request within the predefined time limit. If an attendee does not reply, then it is assumed that he or she will not be attending the IM conference call. To conserve resources on the message server 115, the rule set may be configured to delete the e-mail message 310 from the non-attending recipient's mailbox. Alternatively, the rule set may allow for an alternative message to be delivered to the non-attending recipient's mailbox, such as "Sorry you missed the meeting" or provide instructions where they may retrieve the minutes of the meeting.

Additionally, the time-sensitive messaging allows the sender 105 to send separate messages to each potential attendee 320, 325, and 330 using a single e-mail 310, thereby reducing the need for the sender 105 to create multiple e-mail messages with the same IM conference information. To forward individualized messages to the individual attendees 320, 325, and 330, the sender 105 first establishes a rule set for delivering the e-mail message 310 to the three separate attendees 320, 325, and 330. The sender 105 then creates the separate messages to be delivered to each attendee 320, 325, and 330. After the e-mail message has been delivered to the message server 115, the message server 115 extracts the rules from the header of the e-mail 310 and distributes the individualized messages in accordance with the rules.

Figure 4:
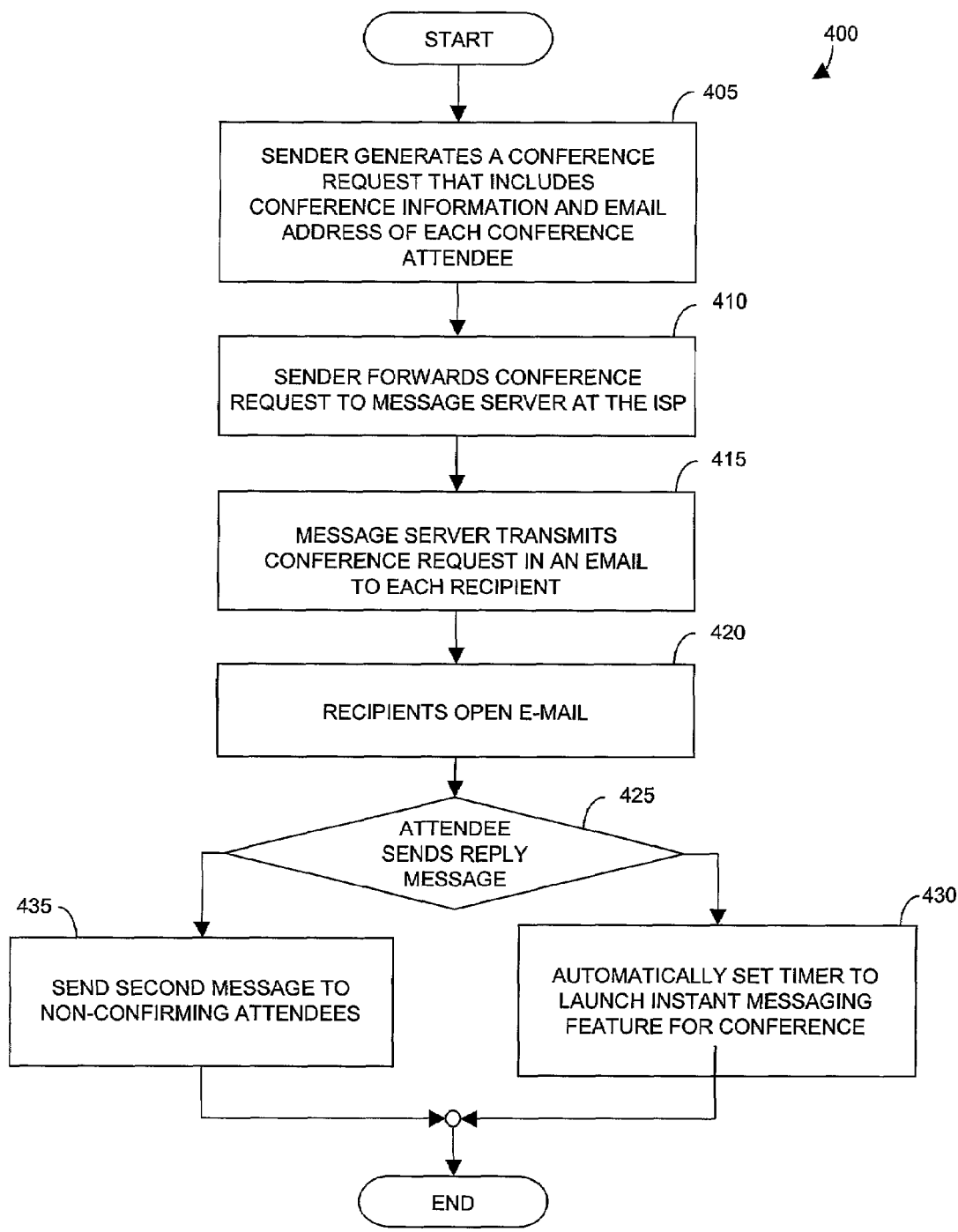
FIG. 4 is a logic flow diagram of a method for using instant messaging for scheduling a conference between multiple attendees.

FIG. 4 is a logic flow diagram illustrating a routine 400 for establishing an IM conference call. Routine 400 begins at 405, in which the sender 105 generates a conference request. The conference request typically includes the e-mail address of each recipient of an instant message who is invited to the IM conference call and the IM conference information.

At 410 the sender 105 transmits the IM conference request to the message server 115 for distribution to each attendee. At 415, the message server 115 parses the IM conference request and retrieves the conference information and each e-mail address of each attendee. The message server 115 then stores the appropriate e-mail 310 containing the IM conference information retrieved from the conference request in each attendee's mailbox at the message server 115. When the attendees 320, 325, and 330 log onto the system, the message server 115 downloads the e-mail message 310 to a message client (not shown) on each attendees Internet appliance (e.g. personal computer, PDA, cellular telephone, etc.).

At 420, each attendee 320, 325, and 330 opens the e-mail message on their Internet appliance and receives the conference details, such as the date and the time of the instant messaging conference. Upon opening the e-mail message 310, a series of buttons may be displayed within each recipient's Internet browser display that allow the recipient to signal whether they will be able to attend the IM conference call at the scheduled time and date. For example, the message client 122 may show a "YES" button and a "NO" button that the recipient may select to generate the reply signal and these replies may activate an Internet browser on the Internet appliance 120. At 425, each recipient generates a reply message back to the sender 105.

At 425, the message server 115 determines whether each attendee has generated a positive or negative reply signal. If an attendee has generated a positive reply signal, indicating that he or she will attend the IM Conference, the "YES" branch is followed to 430. At 430, a timer is automatically set to the date and time of the IM conference call to automatically launch the recipient's Internet browser's IM applet and connect with the IM Server 315. If on the other hand, the determination was made at 430 that the recipient did not generate a positive reply signal, then no connection will be made between the attendee who did not reply and the IM server 315. If however, the attendee does not send a reply e-mail message within predefined time limit, then the "NO" branch is followed to 435, in which a second, or alternative message is sent to the attendee. For example, if the attendee does not reply within the predefined time limit, the, an alternative message The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

I claim:

1. A method for establishing an instant message (IM) conference between a sender and at least one attendee, comprising:

receiving a time-sensitive e-mail message, the time-sensitive e-mail message comprising:
an IM conference request;
an e-mail address associated with each attendee; and
a rule set specifying a predefined time limit governing the delivery of the e-mail message;
receiving and extracting the rule set and the e-mail address for each attendee;
determining the predefined time limit;
forwarding the time-sensitive e-mail message to a mailbox for each attendee in accordance with the rule set;

determining whether the at least one attendee opened the time sensitive e-mail message within the predefined time limit;

if the attendee opened the time-sensitive e-mail message within the predefined time limit, providing the IM conference request to the attendee; and if the attendee did not open the time-sensitive e-mail message within the predefined time limit, not providing the IM conference request to the attendee.

2. The method of claim 1, further comprising:

if the attendee opened the time-sensitive e-mail message within the predefined time limit automatically launching an IM conference.

3. The method of claim 1, further comprising receiving a reply message from each attendee.

4. The method of claim 1, wherein receiving and extracting the rule set and the e-mail address for each attendee is performed at a message server for each attendee.

5. The method of claim 1, receiving and extracting the rule set and the e-mail address for each attendee is performed on an Internet appliance for each attendee.

6. The method of claim 1, further comprising if the attendee did not open the time-sensitive e-mail message within the predefined time limit, delivering an alternate message to the attendee.

7. The method of claim 6, wherein the alternate message provides instructions on retrieving minutes from the conference.

* * * * *